United States Patent
Kos et al.

(10) Patent No.: US 10,760,717 B2
(45) Date of Patent: Sep. 1, 2020

(54) DISSIMILAR METAL CONNECTION AND METHOD FOR OPERATING SUCH A DISSIMILAR METAL CONNECTION

(71) Applicant: General Electric Technology GmbH, Baden (CH)

(72) Inventors: Ewelina Kos, Wurenlingen (CH); Roland Buetikofer, Endingen (CH); Guenter Schmalzbauer, Rheinfelden (DE); Amitkumar Shukla, Turgi (CH)

(73) Assignee: GENERAL ELECTRIC TECHNOLOGY GmbH, Baden (CH)

( * ) Notice: Subject to any disclaimer, the term of this patent is extended or adjusted under 35 U.S.C. 154(b) by 387 days.

(21) Appl. No.: 15/523,340

(22) PCT Filed: Oct. 21, 2015

(86) PCT No.: PCT/EP2015/074399
§ 371 (c)(1),
(2) Date: Apr. 28, 2017

(87) PCT Pub. No.: WO2016/066499
PCT Pub. Date: May 6, 2016

(65) Prior Publication Data
US 2017/0234462 A1    Aug. 17, 2017

(30) Foreign Application Priority Data
Oct. 28, 2014 (EP) .................................. 14190667

(51) Int. Cl.
*F16L 13/007* (2006.01)
*F16L 13/06* (2006.01)
(Continued)

(52) U.S. Cl.
CPC ............ *F16L 13/007* (2013.01); *B23K 31/02* (2013.01); *F16L 13/013* (2013.01); *F16L 13/06* (2013.01);
(Continued)

(58) Field of Classification Search
CPC ....... F16L 13/007; F16L 53/35; F16L 13/013; F16L 13/06; F16L 23/003; F16L 25/0072;
(Continued)

(56) References Cited

U.S. PATENT DOCUMENTS 2,739,828 A    3/1956  Schindler et al.
3,393,297 A *  7/1968  Hart ...................... H05B 3/342
                                                    219/528
(Continued)

FOREIGN PATENT DOCUMENTS

DE    10 2006 038819 A1    2/2008
EP      0 668 120 A1        8/1995

OTHER PUBLICATIONS

Partial European Search Report and Opinion issued in connection with corresponding EP Application No. 14190667.7 dated Apr. 29, 2015.

(Continued)

*Primary Examiner* — Zachary T Dragicevich
*Assistant Examiner* — William S. Choi
(74) *Attorney, Agent, or Firm* — McNees Wallace & Nurick LLC

(57) ABSTRACT

A dissimilar metal connection arrangement comprising a dissimilar metal connection between a first member made of a first metal and having a first end, and a second member made of a second metal different from said first metal with regard to its metallurgical behavior, and having a second end, wherein the first end of the first member is fixedly connected to the second end of the second member. An (Continued)

increased lifetime of the connection is achieved by arranging a heating means at said dissimilar metal connection for controlled heating of said dissimilar metal connection.

16 Claims, 3 Drawing Sheets

(51) Int. Cl.
| | |
|---|---|
| *F16L 23/00* | (2006.01) |
| *F16L 13/013* | (2006.01) |
| *F16L 25/00* | (2006.01) |
| *F16L 59/10* | (2006.01) |
| *F16L 53/35* | (2018.01) |
| *B23K 31/02* | (2006.01) |
| *H05B 1/02* | (2006.01) |
| *B23K 101/00* | (2006.01) |
| *B23K 101/06* | (2006.01) |
| *B23K 103/04* | (2006.01) |
| *B23K 103/18* | (2006.01) |
| *F16L 23/02* | (2006.01) |

(52) U.S. Cl.
CPC ......... *F16L 23/003* (2013.01); *F16L 25/0072* (2013.01); *F16L 53/35* (2018.01); *H05B 1/0244* (2013.01); *B23K 2101/001* (2018.08); *B23K 2101/06* (2018.08); *B23K 2103/04* (2018.08); *B23K 2103/05* (2018.08); *B23K 2103/18* (2018.08); *F16L 23/02* (2013.01); *F16L 59/106* (2013.01); *Y02E 20/16* (2013.01)

(58) Field of Classification Search
CPC ......... F16L 53/00; F16L 59/106; F16L 59/10; F16L 13/004; H05B 1/0244; H05B 3/58; Y02E 20/16
USPC ....... 285/329, 45, 154.2, 187, 405, 412, 363
See application file for complete search history.

(56) References Cited

U.S. PATENT DOCUMENTS

| | | | |
|---|---|---|---|
| 4,830,091 A | 5/1989 | Dierke et al. | |
| 5,687,995 A * | 11/1997 | Mori | F16L 13/004 |
| | | | 285/417 |
| 5,883,364 A * | 3/1999 | Frei | H05B 3/58 |
| | | | 219/535 |
| 2003/0192875 A1* | 10/2003 | Bieker | F16L 53/35 |
| | | | 219/528 |
| 2012/0175889 A1* | 7/2012 | Iijima | F01K 7/16 |
| | | | 290/1 R |
| 2014/0216027 A1* | 8/2014 | Iida | F28D 20/026 |
| | | | 60/529 |

OTHER PUBLICATIONS

Extended European Search Report and Opinion issued in connection with corresponding EP Application No. 14190667.7 dated Jul. 27, 2015.
Invitation to Pay Additional Fees issued in connection with corresponding PCT Application No. PCT/EP2015/074399 dated Jan. 26, 2016.
International Search Report and Written Opinion issued in connection with corresponding PCT Application No. PCT/EP2015/074399 dated Apr. 29, 2016.
International Preliminary Report and Written Opinion issued in connection with corresponding PCT Application No. PCT/EP2015/074399 dated May 2, 2017.
Office Action issued in connection with corresponding EP Application No. 15784642.9 dated Jan. 17, 2019.

* cited by examiner

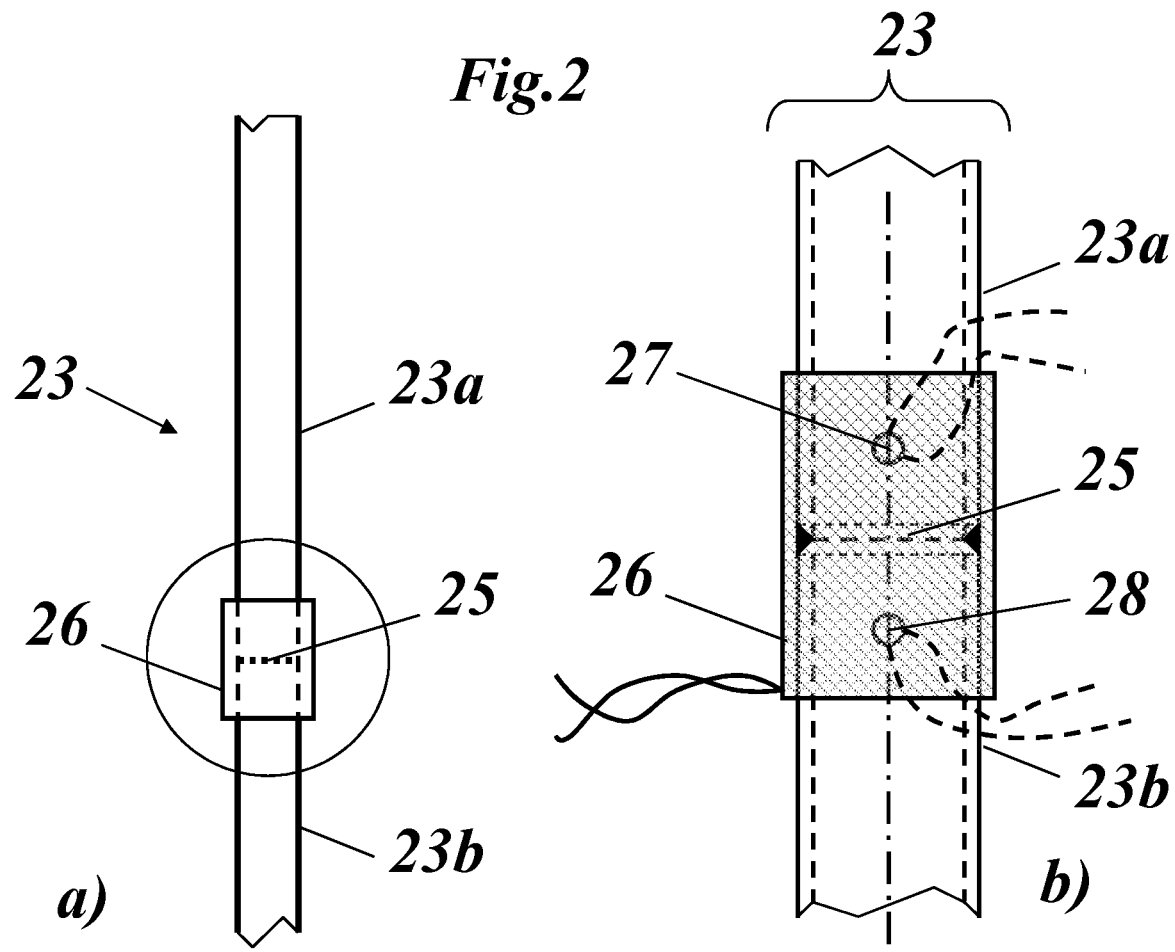
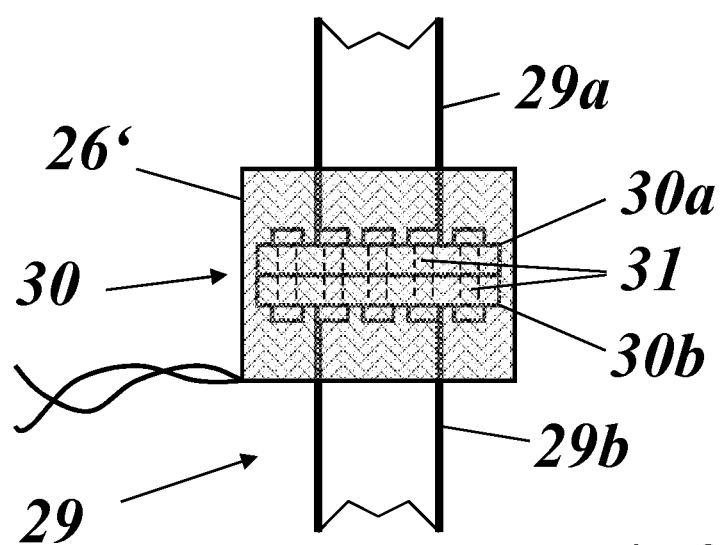

DISSIMILAR METAL CONNECTION AND METHOD FOR OPERATING SUCH A DISSIMILAR METAL CONNECTION

BACKGROUND OF THE INVENTION

The use of different metals/alloys, which differ in their metallurgical behavior and which are called in this context "dissimilar metals" in a joint being exposed to high temperature, high pressure loading, high cyclic, and high transients with external forces and moments, can pose problems of stress and reduced lifetime of this joint.

FIG. 1 shows the basic scheme of a combined cycle power plant (CCPP) 10. The combined cycle power plant 10 of FIG. 1 comprises a gas turbine (GT) 11 connected to a water/steam cycle 12 via a heat recovery steam generator (HRSG) 19.

Gas turbine 11 comprises a compressor 14, which aspirates air through an air inlet 13 and delivers the compressed air to a combustor 15, where it is used to generate hot gas by burning fuel 16. The hot gas drives a turbine 17, and the exhaust gas 18 of the turbine 17 passes through the heat recovery steam generator 19 and finally exits as flue gas 20.

Heat recovery steam generator 19 generates steam for a steam turbine 21. In addition, water from the heat recovery steam generator 19 is fed to an air cooler 22 and used to cool down compressed air from the compressor 14, which is fed to the turbine for cooling purposes. While the water is supplied through a water inlet pipe 24, the generated steam flows back to the heat recovery steam generator 19 via steam outlet pipe 23.

A more detailed plan of a combined cycle power plant is shown in document DE 196 45 322, for example.

The high pressure air cooler 22 of GT 11 usually needs to be made of austenitic stainless steel to avoid high temperature corrosion product entering the hot gas path parts of the turbine 17. At the same time, the remaining water/steam side of the plant, which the cooler is connected to, is made of ferritic steel. The weld connection at the steam outlet pipe 23 of the cooler 22 is a dissimilar metal joint or weld of the kind explained above, and thus experiences reduced lifetime issues.

One of the main factors leading to premature failure of such a dissimilar metal connection is the very high temperature gradient in the wall of the pipe during start-up of the plant.

SUMMARY OF THE INVENTION

It is an object of embodiments of the present invention to provide a dissimilar metal connection for the use in an environment, especially in a combined cycle power plant, where it may be exposed to high temperature, high pressure loading, high cyclic (e.g. repeated use cycles that change load or temperature), and/or high transients (e.g. fast changes of temperature) with external forces and moments, which dissimilar metal connection avoids the disadvantages of the prior art connections, is easy to install, and has an increased lifetime.

It is another object of an embodiment of the present invention to disclose a method for operating such a dissimilar metal connection in order to reap all the advantages of the dissimilar metal connection according to an embodiment of the invention.

These and other objects are obtained by a dissimilar metal connection according to the appended claims.

In at least one aspect, embodiments of invention are directed to a dissimilar metal connection arrangement. In some embodiments, the dissimilar metal connection arrangement can be used in an environment, such as a combined cycle power plant, where it may be exposed to high temperature, high pressure loading, high cyclic, and/or high transients with external forces and moments. The dissimilar metal connection arrangement comprises a dissimilar metal connection between a first member made of a first metal and having a first end, and a second member made of a second metal different from said first metal with regard to its metallurgical behaviour, and having a second end, whereby the first end of the first member is fixedly connected to the second end of the second member.

At least one embodiment comprises a dissimilar metal connection arrangement comprising a heating means arranged at said dissimilar metal connection for controlled heating of said dissimilar metal connection.

In at least one embodiment, the dissimilar metal connection arrangement between the first and second members are pipe sections of a pipe, through which a hot fluid flows when in use.

In at least one embodiment, said pipe is a steam outlet pipe for an air cooler in a combined cycle power plant.

In at least one embodiment, one of said members is made from austenitic stainless steel, while the other of said members is made of ferritic steel.

In at least one embodiment of the dissimilar metal connection arrangement, the dissimilar metal connection comprise a welding joint.

A further embodiment of the dissimilar metal connection arrangement comprises a dissimilar metal connection having a flanged connection with bolts.

Another embodiment of the dissimilar metal connection arrangement comprises heating means surrounding said dissimilar metal connection.

In at least one embodiment, said heating means is powered by an electric current.

In at least one embodiment, said heating means comprises a heating blanket.

In another aspect, an inventive method is disclosed for operating a dissimilar metal connection arrangement according to embodiments of the invention. In the method, said first and second members are heated from a first low starting temperature to a second high operating temperature, wherein said dissimilar metal connection are preheated by said heating means before and/or during the transition of said first and second members from said first to said second temperature. Even just preheating during the heating period can help avoid the dissimilar metal connection being subjected to short periods of rapid heating if periods of rapid heating occur during the heating of the first and second members.

In at least one embodiment of the above method the dissimilar metal connection is preheated (in at least one embodiment, the preheating occurs slowly) by said heating means from said first low starting temperature to a temperature close to said second high operating temperature, and, in at least one embodiment, said preheating begins before said transition of said first and second members from said first low starting temperature to said second high operating temperature starts.

Another embodiment of the method comprises using temperature sensing means to monitor the temperature of the first end of the first member and the temperature of the second end of the second member.

In at least one embodiment, thermocouples are used as the temperature sensing means.

A further embodiment of the method the dissimilar metal connection arrangement is part of a combined cycle power plant having a power plant control unit and that said heating means is connected to said power plant control unit.

In at least one embodiment, the operation of said heating means is implemented into the operation logic of the combined cycle power plant, and that said heating means is switched on automatically, and then switched off automatically, as soon as the required preheating temperature is reached.

BRIEF DESCRIPTION OF THE DRAWINGS

The present invention is now to be explained more closely by means of different embodiments and with reference to the attached drawings.

FIG. 2 shows an embodiment of a dissimilar metal connection in form of a welded pipe joint surrounded by a heating blanket in a general view (a) and in a more detailed view (b);

FIG. 3 shows another embodiment of a dissimilar metal connection according to the invention in form of a flanged pipe joint with bolts surrounded by a heating blanket.

DETAILED DESCRIPTION

Stresses in a dissimilar metal connection or joint resulting from of a high temperature gradient in a transient state can be easily reduced with application of a heating blanket or equivalent heating means.

Figure 1:
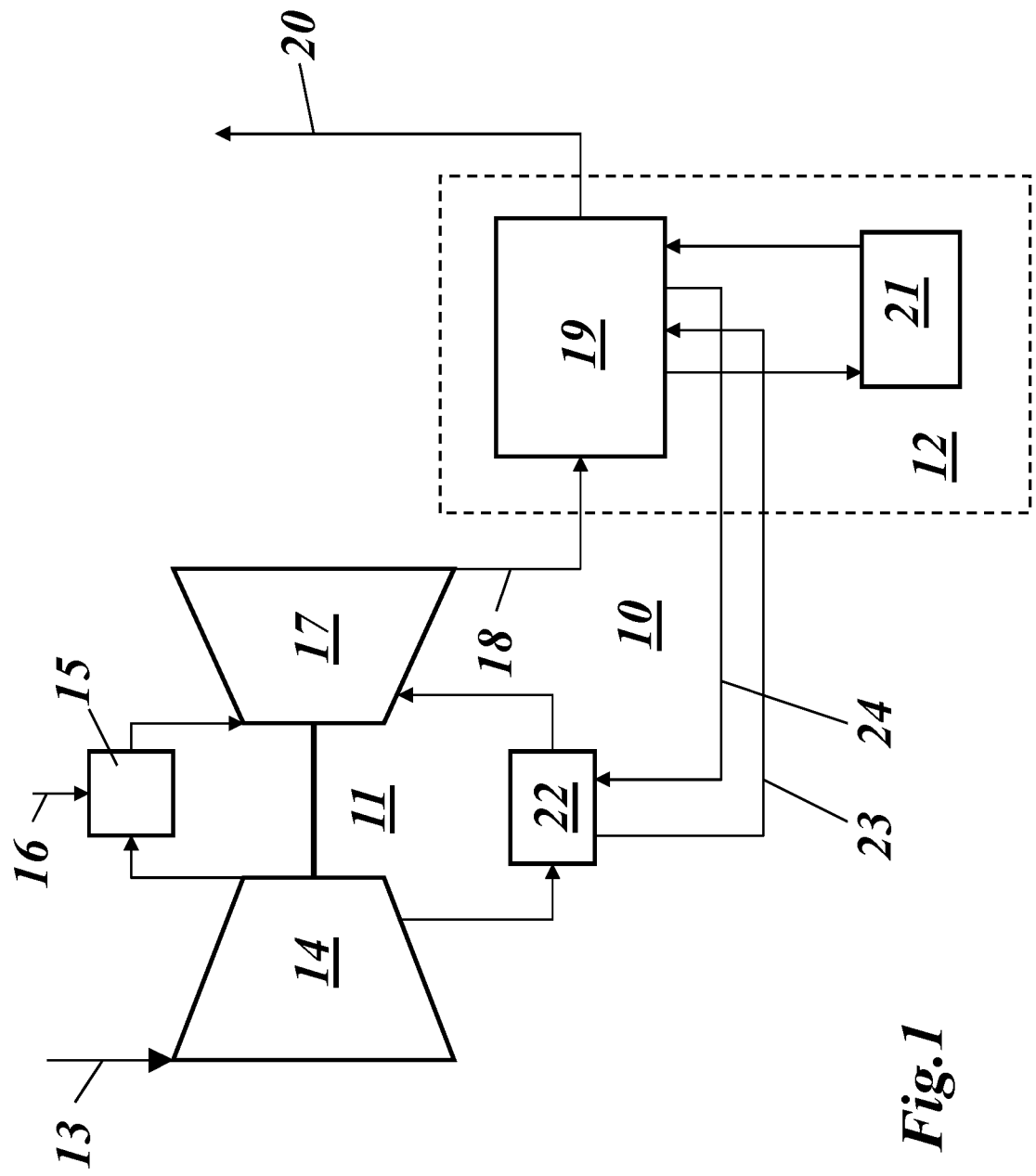
FIG. 1 shows a simplified scheme of a combined cycle power plant (CCPP), where a dissimilar metal connection is implemented.

When the joint is a welded pipe joint between an air cooler (22 in FIG. 1) and a water/steam cycle (12 in FIG. 1) in a combined cycle power plant CCPP (10 in FIG. 1), a heating blanket placed around said pipe joint would slowly heat up a weld seam in said joint to a temperature close to the operating temperature, before the steam generated in the cooler starts to flow inside of the pipe (steam outlet pipe 23 in FIG. 1).

A respective pipe joint configuration is shown in FIG. 2. The steam outlet pipe 23 comprises two pipe sections 23a and 23b made of a dissimilar metal and being joined at their ends by a welding joint 25 (welded joint or weld). The welding joint 25 and the adjacent end sections of the two pipe sections 23a and 23b are surrounded by an electrically powered heating blanket 26, which is in thermal contact with the pipe ends and the welding joint 25.

Figure 4:
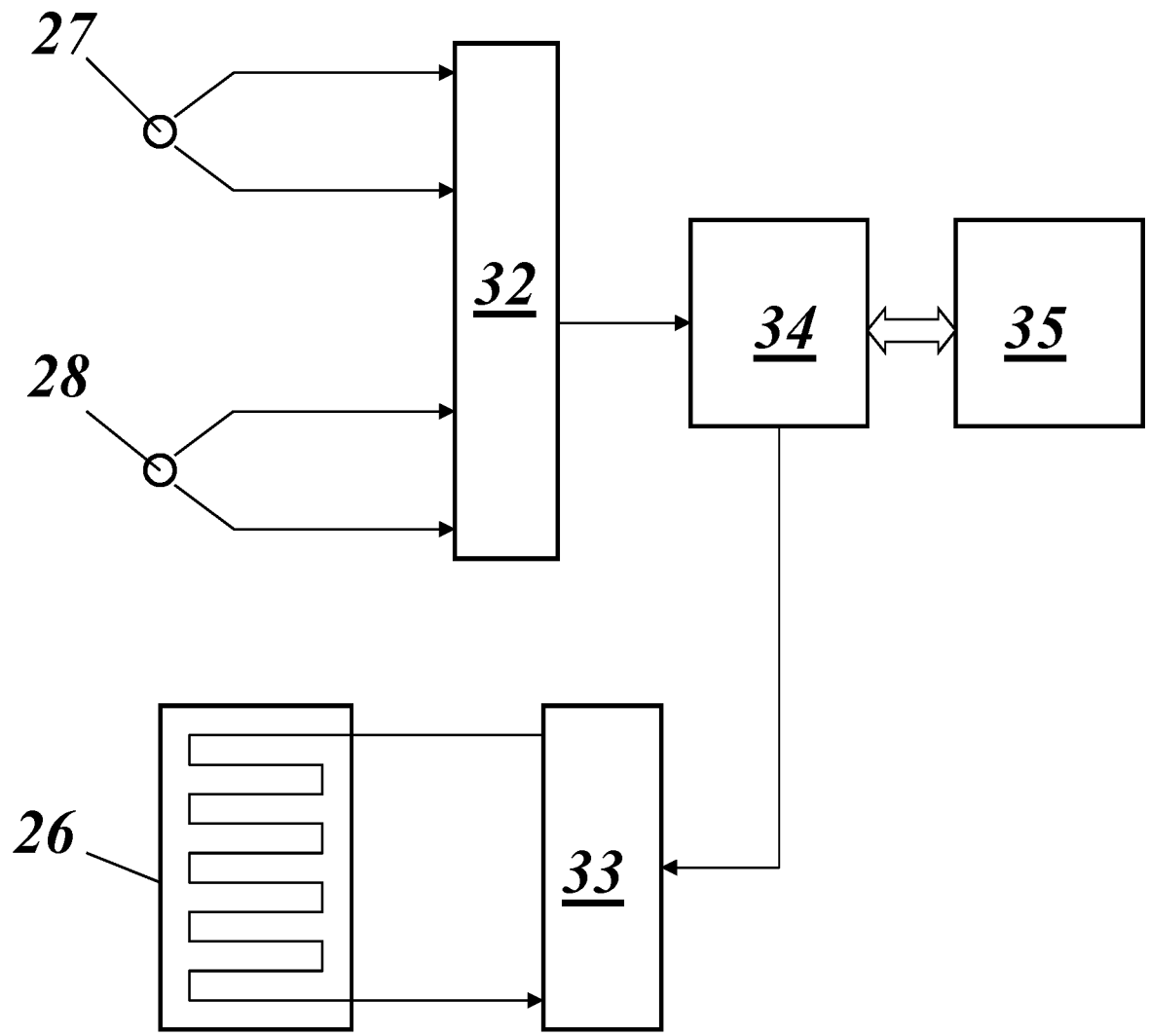
FIG. 4 shows a control scheme for a pipe joint according to FIG. 2 being used in a power plant according to FIG. 1.

The heating blanket 26 must be connected with a control room of the power plant 10 and its operation implemented into the operation logic of the plant, as shown in FIG. 4, where the heating blanket 26 is connected to a blanket power supply 33, which is controlled by a temperature control circuit 34 being in connection with a power plant control unit 35. This way, the heating blanket 26 can be switched on automatically without any operator engagement. The heating blanket 26 is fitted with thermocouples 27, 28 on both pipe ends (see FIG. 2(b) and FIG. 4), which are connected to the temperature control unit 34 via a temperature measuring circuit 32, to control the temperature of the weld seam 25. As soon as the required temperature is reached, the heating blanket 26 can be switched off automatically.

Pre-warming or preheating of the dissimilar metal connection can also be also used for a flanged joint or flanged connection 30 between pipe section 29a and 29b of a dual material pipe 29, as shown in FIG. 3, which may be used as an alternative to a weld seam. In a flanged joint 30, one of the biggest problems is overloading the bolts 31 and flanges 30a,b during start-up of the plant caused by uneven heating of the flanges 30a,b and the bolting. Bolts 31 which are not subjected to the steam flow heat up much slower and suffer very high stresses by being stretched by the already hot flanges 30a,b. By using a heating blanket 26', the bolts 31 are uniformly heated up together with the flanges 30a,b before the steam is admitted to the pipeline.

The invention claimed is:

1. A dissimilar metal connection arrangement comprising:
a first member made of a first metal, the first member having a first end portion terminating at a first end;
a second member made of a second metal different from the first metal at least with regard to its metallurgical behavior, the second member having a second end portion terminating at a second end;
a dissimilar metal connection between the first end of the first member and the second end of the second member; and
a heat source surrounding the dissimilar metal connection, the first end portion, and the second end portion and configured to heat only the dissimilar metal connection, the first end portion, and the second end portion;
wherein the dissimilar metal connection arrangement is located in a combined cycle power plant;
wherein the first member and the second member are sections of a pipe, through which a hot fluid flows when in use; and
wherein the dissimilar metal connection comprises a welding joint.

2. The dissimilar metal connection arrangement according to claim 1, wherein the pipe is a steam outlet pipe of an air cooler in the combined cycle power plant.

3. The dissimilar metal connection arrangement according to claim 2, wherein the first member is made from austenitic stainless steel, while the second member is made of ferritic steel.

4. The dissimilar metal connection arrangement according to claim 1, wherein the heat source is powered by an electric current.

5. The dissimilar metal connection arrangement according to claim 4, wherein the heat source comprises a heating blanket.

6. The dissimilar metal connection arrangement according to claim 1 further comprising a temperature sensor monitoring a first temperature of the first end portion and a second temperature of the second end portion.

7. The dissimilar metal connection arrangement according to claim 6, wherein the temperature sensor comprises a first thermocouple at the first end portion and a second thermocouple at the second end portion.

8. The dissimilar metal connection arrangement according to claim 1, wherein the heat source is configured to heat the dissimilar metal connection, the first end portion, and the second end portion to an operating temperature.

9. A method for operating a dissimilar metal connection comprising:
providing a dissimilar metal connection between a first end of a first member and a second end of a second member, wherein the first member is made of a first metal and the second member is made of a second metal different from the first metal at least with regard to its metallurgical behavior, the first member having a first end portion terminating at the first end, the second member having a second end portion terminating at the second end;

providing a heat source surrounding the dissimilar metal connection, the first end portion, and the second end portion;

heating only the dissimilar metal connection, the first end portion, and the second end portion from a first low starting temperature to a second high operating temperature; and preheating the dissimilar metal connection using the heating source before and/or during a transition of the first member and the second member from the first low starting temperature to the second high operating temperature;

wherein the dissimilar metal connection, the first member, and the second member are located in a combined cycle power plant;

wherein the first member and the second member are sections of a pipe, through which a hot fluid flows when in use; and wherein the dissimilar metal connection comprises a welding joint.

10. The method according to claim 9, wherein the preheating by the heat source is from the first low starting temperature to a temperature close to the second high operating temperature, and the preheating begins before the transition of the first member and the second member from the first low starting temperature to the second high operating temperature occurs.

11. The method according to claim 9, wherein the temperature of the first end portion and the temperature of the second end portion are monitored by a temperature sensor.

12. The method according to claim 11, further comprising sensing the temperature using thermocouples.

13. The method according to claim 9, wherein the dissimilar metal connection is part of the combined cycle power plant having a power plant control unit, and the heat source is connected to the power plant control unit.

14. The method according to claim 9, wherein the heating using the heat source is implemented into the operation logic of the combined cycle power plant, and the heat source is switched on automatically, and then switched off automatically, as soon as the required preheating temperature is reached.

15. A dissimilar metal connection arrangement comprising:

a first member made of a first metal, the first member having a first end portion terminating at a first end;

a second member made of a second metal different from the first metal at least with regard to its metallurgical behavior, the second member having a second end portion terminating at a second end;

a dissimilar metal connection between the first end of the first member and the second end of the second member; and a heat source surrounding the dissimilar metal connection, the first end portion, and the second end portion and configured to heat only the dissimilar metal connection, the first end portion, and the second end portion;

wherein the dissimilar metal connection arrangement is located in a combined cycle power plant;

wherein the first member and the second member are sections of a pipe, through which a hot fluid flows when in use; and wherein the pipe is a steam outlet pipe of an air cooler in the combined cycle power plant.

16. The dissimilar metal connection arrangement according to claim 15, wherein the dissimilar metal connection comprises a flanged connection with bolts.

* * * * *